May 23, 1967 H. J. SEJDA 3,321,352
APPARATUS FOR WRAPPING TAPE ABOUT AN ELONGATE ARTICLE
Filed April 5, 1963 6 Sheets-Sheet 1
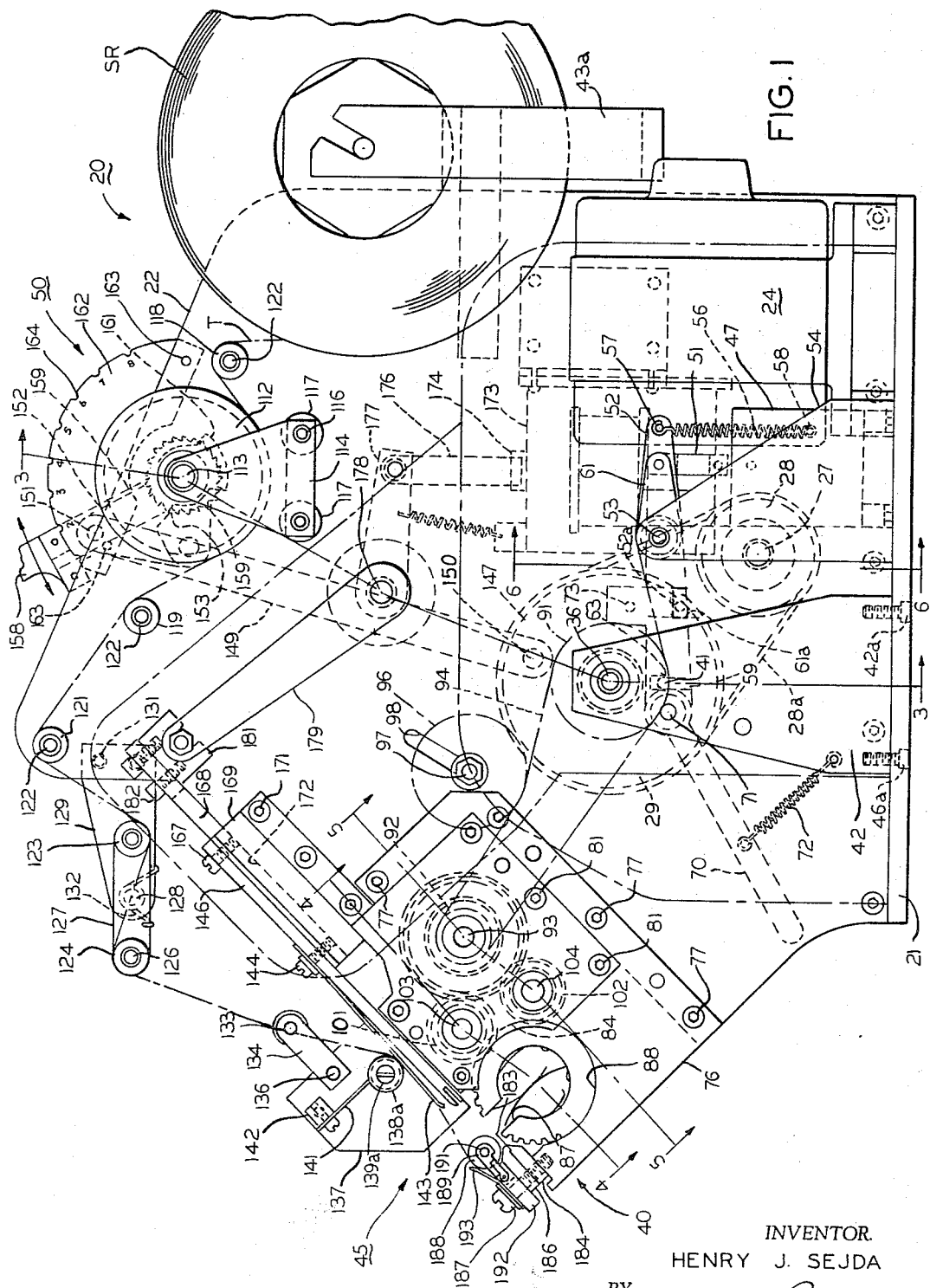
FIG. 1
INVENTOR.
HENRY J. SEJDA
BY
ATTORNEY May 23, 1967  H. J. SEJDA  3,321,352
APPARATUS FOR WRAPPING TAPE ABOUT AN ELONGATE ARTICLE
Filed April 5, 1963  6 Sheets-Sheet 2
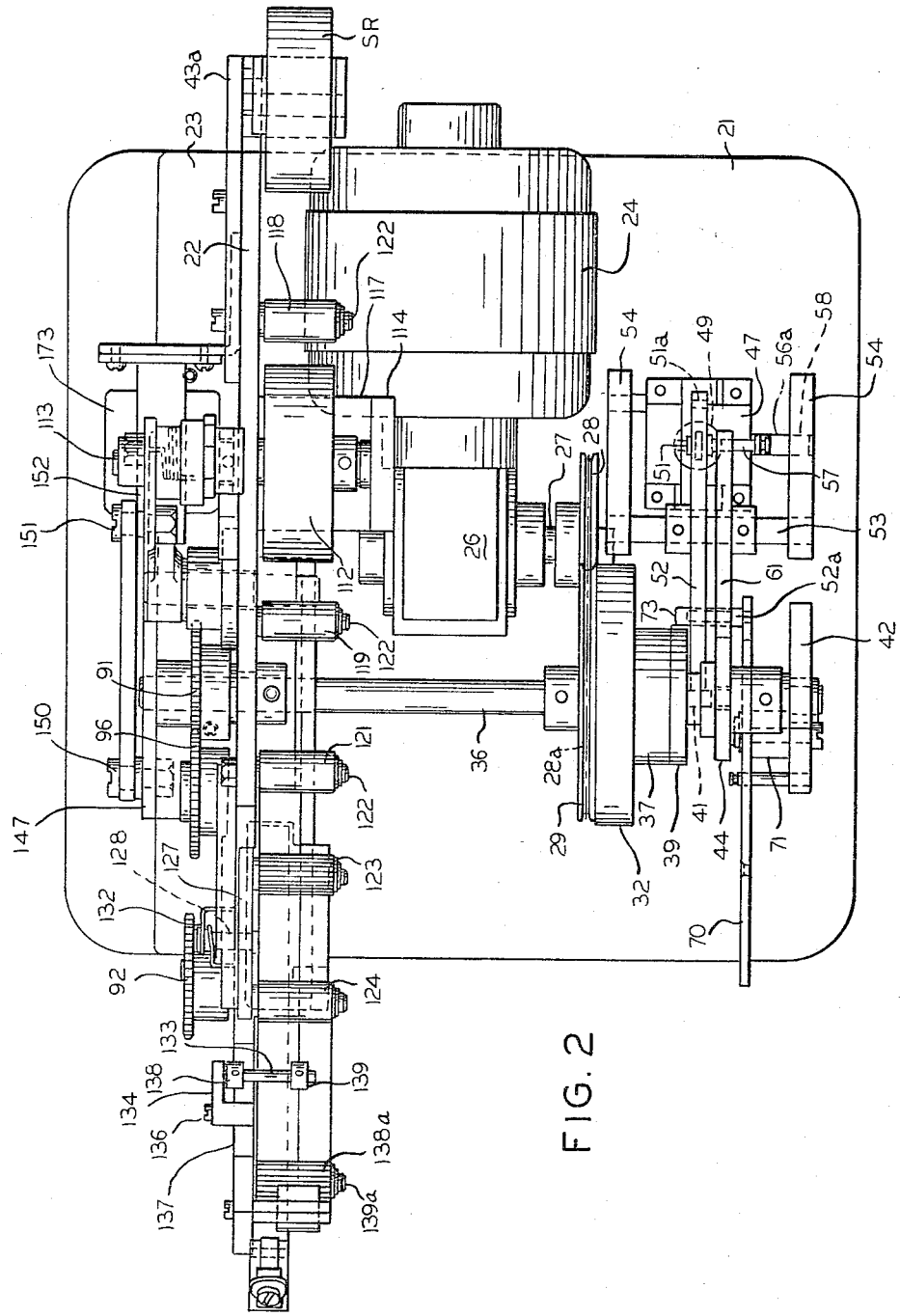
FIG. 2
INVENTOR.
HENRY J. SEJDA
BY
ATTORNEY

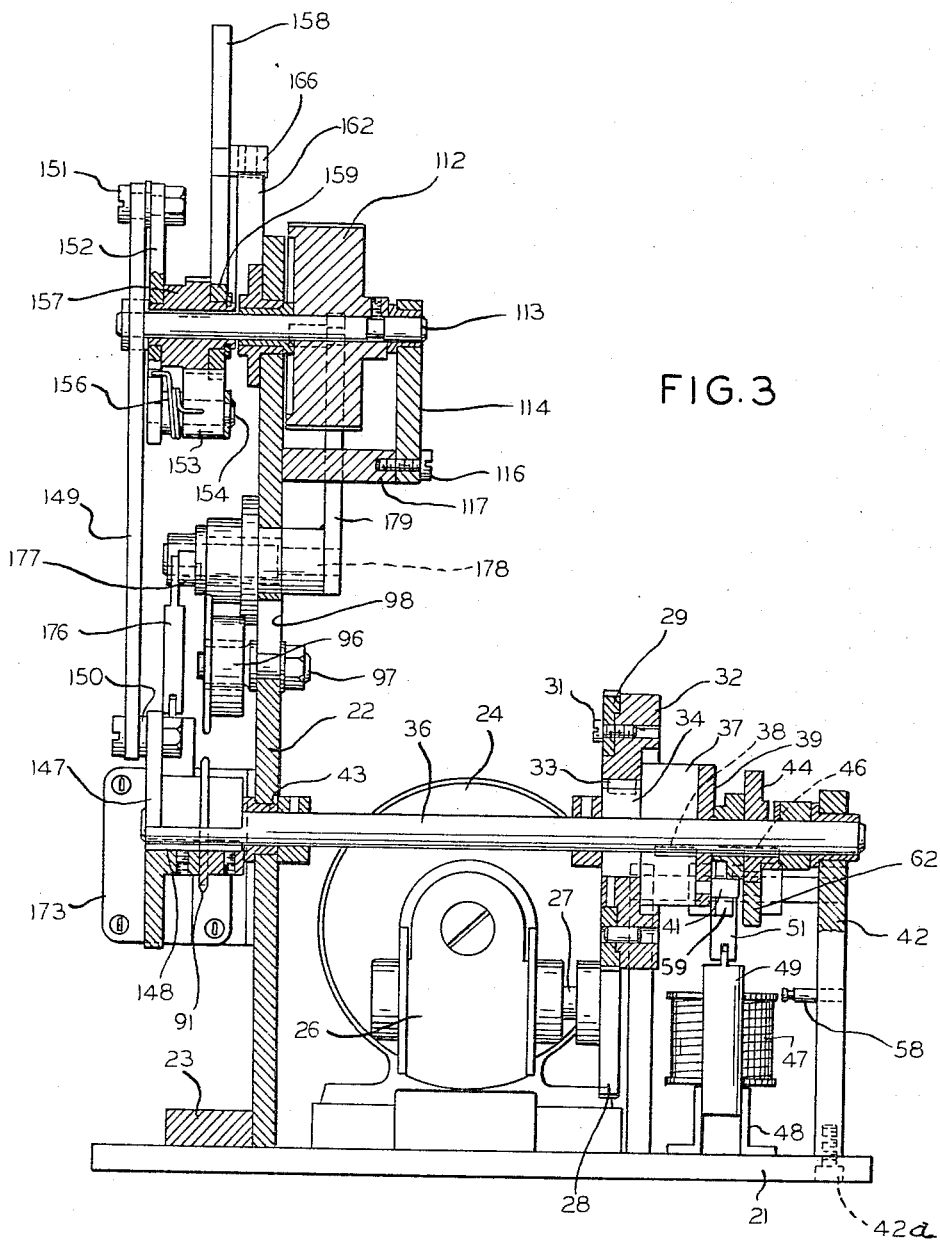

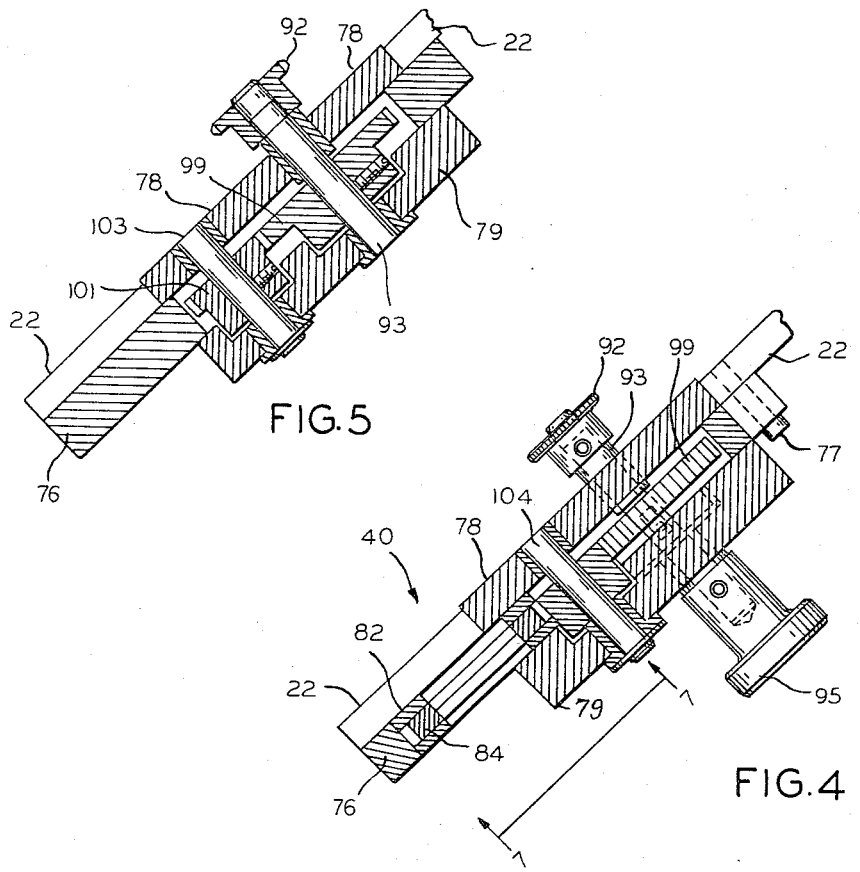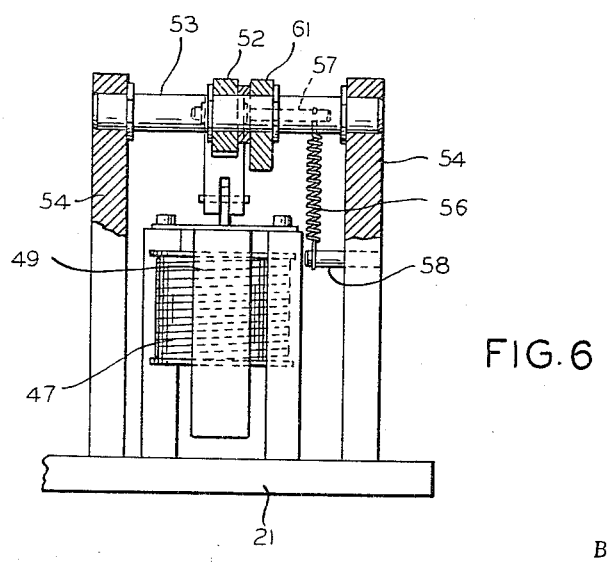

May 23, 1967  H. J. SEJDA  3,321,352
APPARATUS FOR WRAPPING TAPE ABOUT AN ELONGATE ARTICLE
Filed April 5, 1963  6 Sheets-Sheet 6
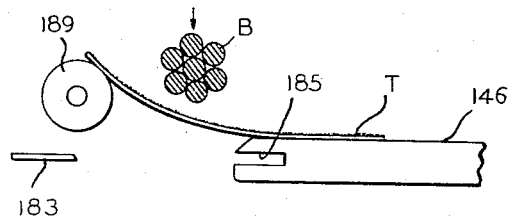
FIG. 10
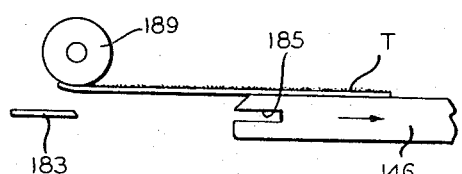
FIG. 14
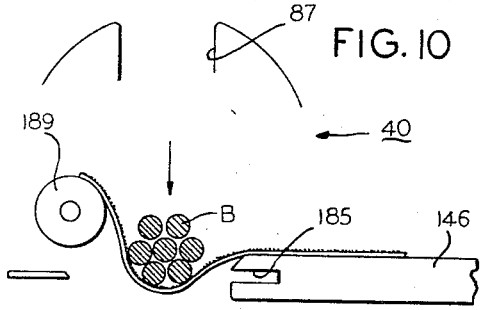
FIG. 11
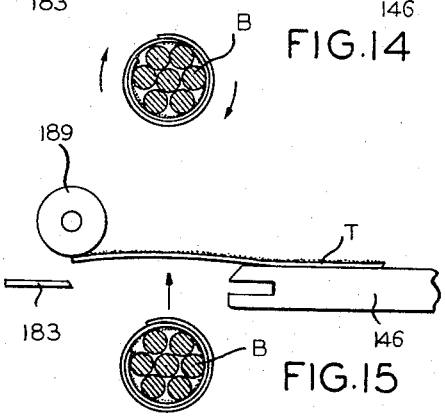
FIG. 15
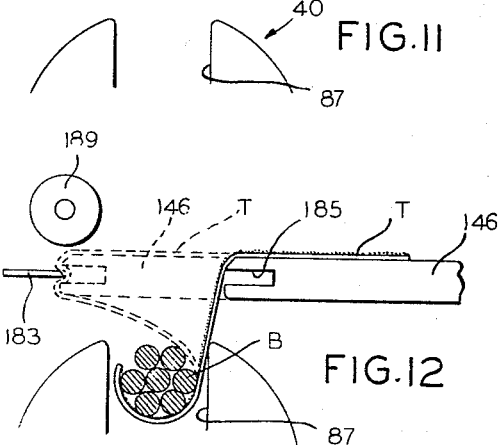
FIG. 12
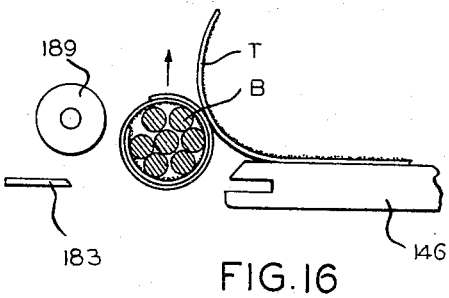
FIG. 16
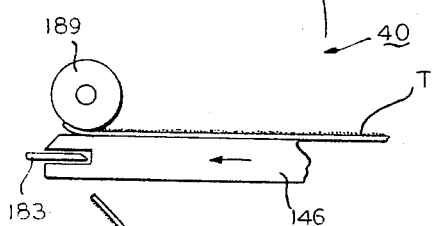
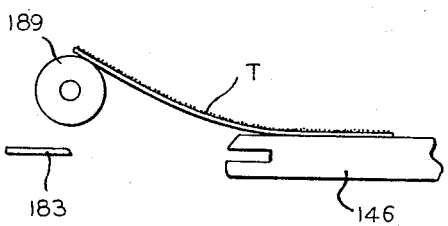
FIG. 17
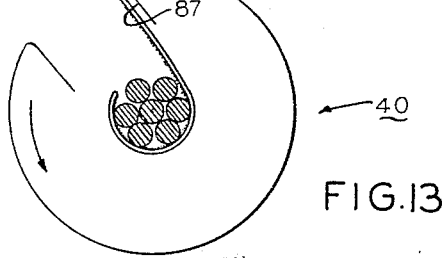
FIG. 13
*INVENTOR.*
HENRY J. SEJDA
BY
ATTORNEY

United States Patent Office 3,321,352
Patented May 23, 1967

3,321,352
APPARATUS FOR WRAPPING TAPE ABOUT AN ELONGATE ARTICLE
Henry J. Sejda, Munster, Ind., assignor to Cee-Kay Industries, Inc., Chicago, Ill., a corporation of Illinois
Filed Apr. 5, 1963, Ser. No. 270,992
16 Claims. (Cl. 156—468)

This invention relates generally to apparatus for wrapping material such as tape about an elongate object, and has particular reference to an improved machine for wrapping a discrete length of pressure sensitive tape about an elongate article such as a wiring harness or the like.

Apparatus according to the present invention finds particular application in wrapping a bundle of elongate materials at intervals throughout its length, an example being a wire harness or the like. It is desirable to wrap such harness in a fashion that a lead can conveniently be extended from the wrapped bundle in a direction lateral to the main axis of the wrapped bundle. By reason of such lateral extending leads, the wrapping about the harness cannot be continuous. Moreover, the wrapping of the harness at points intermediate such leads cannot ordinarily be affected without disturbing the laterally extending leads, particularly if the entire harness must be rotated for the wrapping operation.

The apparatus according to the present invention is characterized by the use of a wrapping tape having a pressure sensitive film thereon, the wrapping tape being initially in a position across a radially extending jaw of a rotating wrapping chuck. The harness or bundle of elongate members is moved against the tape and into the jaw so as to provide a starting bight of the tape about the bundle, the rotation of the chuck causing the tape to be wrapped about the bundle while feed movement of an additional length of tape is being had, this feed movement occurring prior to the cut-off of the tape by a tape cutting mechanism, the operation of which is related to the rotation of the chuck.

The operation of the tape cut-off mechanism is such that after the completion of the operation thereof, a length of tape is held in position by the pressure sensitive film thereon across the jaws of the chuck, the tape being capable of yielding upon removal of the wrapped article from the chuck, and being thereafter in position so as to provide the starting bight described.

With the foregoing considerations in mind, it is a principal object of the invention to provide apparatus for wrapping a discrete length of tape about a bundle of elongate members such as a wire harness or the like.

Another object is to provide a wrapping structure characterized by a wrapping chuck having a radially extending jaw for receiving an elongate article to be wrapped, a length of the tape being initially in position across the jaw, so that the entrance of the elongate article into the jaw provides a bight of the tape about the article, the rotation of the wrapping chuck being accompanied by operation of tape feeding mechanism for an additional length of tape, said tape feeding mechanism cooperating with tape cut-off mechanism which leaves the fed length of tape in position for a subsequent wrapping operation.

Still another object is to provide wrapping structure wherein the movement of the tape cut-off mechanism leaves the tape in position across the chuck jaw and held in position partly by the "tack" of the pressure sensitive tape, the tape being capable of being displaced when the wrapped bundle is removed from the chuck, but being thereafter in position for creating a starting bight about the bundle in a subsequent wrapping operation.

A yet further object is to provide structure for a wrapping machine of the kind described effective to vary the amount of tape being fed to the wrapping chuck so as to vary the amount of tape wrapped about the article, such tape being effective to maintain the tape in what may be considered a stored condition prior to the subsequent wrapping operation.

A yet further object is to provide mechanism of the class described and consisting of a wrapping chuck adapted to wrap an elongate article with a pressure sensitive tape and to provide structure cooperating with the movement of the wrapping chuck capable of severing a length of tape to be wrapped about the article, the mechanism being adapted to provide a length of tape which is in position for a subsequent wrapping operation.

Other objects and important features of the invention will be apparent from a study of the following specification taken with the drawings, which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

FIG. 1 is an elevational view of a wrapping machine having the improvements according to the present invention embodied therein;

FIG. 2 is a plan view thereof;

FIG. 3 is a sectional view taken along the line 3—3 of FIG. 1, looking in the direction of the arrows, certain parts being shown in elevation;

FIG. 4 is a sectional view taken along the line 4—4 of FIG. 1, looking in the direction of the arrows, showing details of the wrapping chuck, and the gear driving mechanism therefor;

FIG. 5 is a sectional view taken along the line 5—5 of FIG. 1, looking in the direction of the arrows, showing further details of the drive mechanism for the wrapping chuck;

FIG. 6 is a view taken along the line 6—6 of FIG. 1, looking in the direction of the arrows, showing details of mechanism for controlling the operation of a clutch and index mechanism for the wrapping machine according to the present invention;

Figure 7:
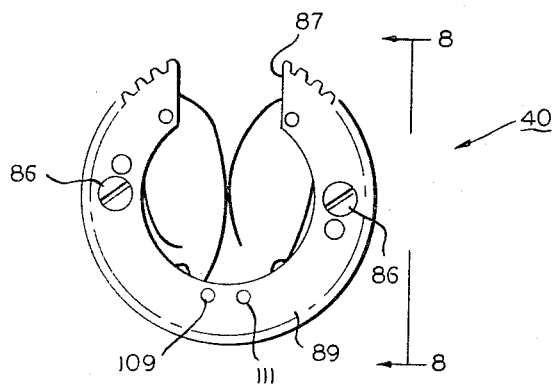
FIG. 7 is a view looking in the direction of the arrows 7—7 of FIG. 4, showing details of the wrapping chuck.

FIGS. 10 to 17 inclusive show schematically the wrapping of the elongate article, and the movement of the tape cutting mechanism for severing a length of tape to be wrapped about an elongate article in the wrapping chuck, and showing details of mechanism whereby the tape is held in position prior to removal of the wrapped article from the chuck, and thereafter in a position for forming about a subsequent article to be wrapped a proper starting bight.

General description of machine

Referring now particularly to FIGS. 1 to 3 of the drawings, the improved wrapping apparatus according to the present invention is referred to generally by the reference numeral 20, and includes a base 21 supporting a frame 22 having a foot 23, foot 23 and the frame 22 being secured together in any convenient fashion, and foot 23 being secured to the base 21 by any suitable means.

Base 21 supports a drive motor 24 for the wrapping apparatus 20, motor 24 being drivably connected to a speed reducer 26 having an output shaft 27. A drive pulley 28 is fast on the output shaft 27 and connects by a belt 28a to a driven pulley 29 secured by screws 31 to a driving clutch member 32 keyed at 33 to a second clutch member 34 supported on a main drive shaft 36. The second clutch member 34 cooperates with a driven clutch member 37 made fast to the shaft 36 by means of a key 38. Clutch members 32 and 37 are under the control of a control release member 39 having a clutch release pin 41 extending therefrom, which release pin causes upon restraint thereon, release of the clutching connection between the motor 24 and the driven shaft 36 under conditions as will be described. Precise details of the clutching mechanism just briefly described form no part of the present invention, but they are of the one-revolution one-way type such as manufactured by the Hilliard Corporation of Elmira, N.Y. The details of operation of the clutch also form no part of the invention herein, and it is sufficient to say that any controllable one-way one-revolution clutch of any other form will suffice as well.

The clutch mechanism described is adapted to give intermittent motion to the drive shaft 36 which is supported at one end in a standard 42 held to the base 21 by screws 42A, the other end of the shaft 36 being mounted in a bushing 43 supported in the frame 22. The intermittently rotating drive shaft 36 is adapted to provide intermittent rotary motion to a wrapping chuck indicated generally by the reference numeral 40, a tape severing mechanism indicated generally by the reference numeral 45, and a variable length tape feed mechanism indicated generally by the reference numeral 50, details of which mechanism will be described in more detail as this specification proceeds.

The aforesaid tape feed mechanism is adapted to give intermittent feed motion to a length of tape T which is supplied from a supply reel SR supported on a bracket 43A extending from the main frame 22 as seen in FIG. 1. The wrapping chuck 40, the tape severing mechanism 45 and the tape feed mechanism 50 are all arranged to have an index or start position, whereby the parts are in a position to perform a wrapping operation on a bundle of elongate articles B, seen particularly in FIGS. 10 to 17 inclusive.

In order to provide for the proper index position of the shaft 36 and the proper index position of the mechanisms 40, 45 and 50, structure is provided for disengaging the one-way clutch previously described and its driven clutch member 37, while the drive motor 24 continues to operate. The shaft 36 accordingly has an index member 44 which is keyed thereto by a key 46. Structure is provided for imposing a restraint first on the clutch release pin 41 and then on the index member 44 to index the shaft 36 to a position corresponding to the start or index position previously described.

To this end a push-type solenoid 47 is provided, see also FIG. 6, solenoid 47 being mounted to the base 21 on mounting legs 48. The solenoid 47 has an armature 49 pivotally connected by a link 51 to a first pawl arm 52. Pawl arm 52 is pivotally mounted on a shaft 53 supported at its ends on spaced standards 54, 54 flanking the solenoid 47 and resting upon the base 21. Pawl arm 52 has an end 59 thereof adapted upon de-energization of the solenoid 47 to engage clutch release pin 41.

A second pawl arm 61 is mounted side-by-side with pawl arm 52 and is likewise mounted for rocking movement on the support shaft 53, see again FIG. 6, and has an end 62 thereof adapted to engage a detent slot 63 in the indexing member 44 when solenoid 47 is de-energized.

Pawl arms 52 and 61 are urged to their respective clutch release and index positions for index of shaft 36 by a return spring 56 held between a pin 57 and a pin 58 extending from one of the standards 54 seen in FIG. 6.

Upon energization of the solenoid 47, which is of the push type, the two pawl arms are arranged for conjoint operation, pawl arm 52 being arranged to pick up arm 61 for release of index member 44.

Pawl arm 61 has a small pick-up pin 52a extending therefrom so that upon rocking movement of pawl arm 52 in a counter clockwise direction as seen in FIG. 1, pin 52a will engage with a cut-out portion 61a in a pawl arm 52, so that the movement of the end 59 of pawl arm 52 out of contact with the pin 41 will take place at the same time the pawl arm 61 is released from index member 44.

However, when solenoid 47 is de-energized, the end 59 of pawl arm 52 is free to move against clutch disengage pin 41, which occurs a slight interval of time prior to the end 62 of pawl arm 61 moving into index slot 63. It will be seen that the clutch is released prior to indexing of shaft 36 so that the torque of motor 24 is not imposed on index member 44.

Pawl arms 52 and 61 can be manually released for operation and rotation of the shaft 36 without use of the solenoid 47. This may be indicated when it is desired to test the operation of the apparatus according to the present invention. Accordingly, a release lever 70 is pivoted upon the frame 42 on a stub shaft 71, see also FIG. 2. Release lever 70 is adapted to be rocked about the stub shaft 71 in a clockwise direction against the bias of a spring 72 connected between the release lever 70 and the shaft support bracket 42. Release lever 70 has a pin 73 extending therefrom which is spaced from the two pawl arms 52 and 61, these normally being urged in a clockwise direction previously described to effect release of the clutch and indexing of the member 44 in the manner previously described. Rocking movement of the arm 70 in a clockwise direction causes the pin 73 to move into engagement with the two pawl arms 52 and 61 to rock them in a counter clockwise direction and effect the driving connection as desired. During normal operation, arm 70 is not operated, and the solenoid 47 is employed as the sole control of rotation of the shaft 36.

*Description of article wrapping chuck*

Figure 8:
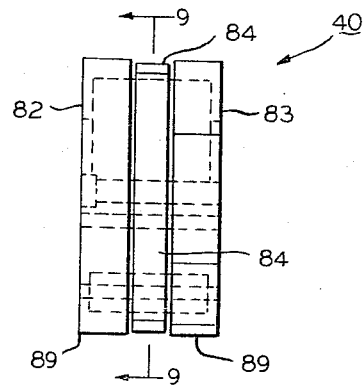
FIG. 8 is a view looking in the direction of the arrows 8—8 of FIG. 7.
Figure 9:
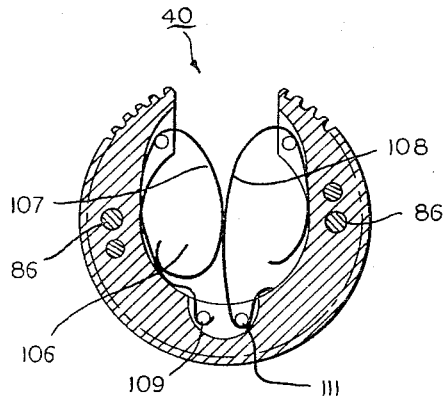
FIG. 9 is a section taken along the lines 9—9 of FIG. 8, looking in the direction of the arrows.

Referring now particularly to FIGS. 1, 4 and 5 of the drawings, the article wrapping chuck 40 is mounted for rotation in a support plate 76 secured to the frame 22 by a plurality of cap screws 77. Plate 76 is flanked at each side by a pair of spaced plates 78 and 79, these being held to the plate 76 by a plurality of fastening screws 81. As seen in FIGS. 7 to 9 inclusive, the article wrapping chuck 40 comprises a pair of generally circular plate-like body members 82 and 83 which flank a gear member 84, the body members 82 and 83 being secured to the gear member by means of counter sunk screws 86. As seen particularly in FIGS. 7 and 9, the members 82, 83 and 84 are each provided with a radially extending slot to define a radial jaw 87 for the entrance to the chuck 40 of the bundle of elongate members B, see FIGS. 10 to 17 inclusive, which are wrapped with a length of the tape T. As seen in FIG. 1, the bearing plate 76 has a circular opening 88 therein, the surface thereof providing a bearing surface for surfaces 89 on the two members 82 and 83. As seen particularly in FIG. 4, the cover plates 78 and 79 guide the rotating chuck 40 within the bearing support plate 76.

Structure is provided for imparting rotative movement to the chuck 40, and consists of a driving sprocket 91 mounted on the driven shaft 36, see also FIGS. 1 to 3. Sprocket 91 is connected to a driven sprocket 92, see FIG. 5, fast on a shaft 93 supported in the plates 78 and 79. A sprocket chain 94 connects the two sprockets 91 and 92, and the slack in sprocket chain 94 is adjusted by an idler sprocket 96 mounted on a stub shaft 97 arranged to be adjusted in position within a slot 98 in the frame 22. Shaft 93 can be turned, if necessary, by a hand wheel 95.

Shaft 93 has a drive gear 99 fast thereon, and drive gear 99 meshes with a pair of idler gears 101 and 102, idler gear 101 being supported on a shaft 103 mounted at its ends in the two support plates 78 and 79, and idler gear 102 being mounted on a shaft 104 also supported in the two plates 78 and 79. The two idler or reach gears 101 and 102 mesh with the gear 84 driving the rotating chuck 40. It will be seen that driving energy is at all times imparted to the wrapping chuck 40 irrespective of the slot which defines jaw 87 therein, since at all times one of the reaching gears 101 or 102 is engaged with the teeth of the gear 84.

Referring again to FIGS. 7 to 9 inclusive, the members 82 and 83 together with the gear member 84 define a cavity 106 for the bundle B which is wrapped within the chuck 40. During the wrapping operation, the bundle B is held against rotation and the tape T to be wrapped therearound and bundle B are constrained between a pair of leaf spring members 107 and 108, these being anchored at their ends about pins 109 and 111 held in the body members 82 and 83.

*Details of tape feeding structure*

As seen particularly in FIG. 1, tape T which is stored on the supply reel SR is adapted to be advanced by a feed roller 112 which has a knurled or other tape gripping surface. It should be borne in mind that the tape T is unreeled from the supply roll SR with its pressure sensitive or adhesive surface on the upper side thereof. Feed roller 112 is mounted on a shaft 113 supported at one end in the frame 22 and at its other end on a bracket 114 secured by screws 116 to the frame 22, there being a spacer member 117 located between the bracket member 114 and the frame 22.

Tape T is led from the supply roll SR around a first idler roll 118 and beneath the feed roll 112 and over spaced idler rolls 119 and 121, the rolls 118, 119 and 121 being supported on stub shafts 122 extending from the frame 22. The length of tape T is further guided under and over idler rolls 123 and 124 supported on pin shafts 126 extending from a slack take-up arm 127. Slack take-up arm 127 is mounted on a pivot pin 128 extending from a bracket 129 held by screws 131 to the frame 22. A torsion spring 132 wrapped about the pin 128 supporting the take-up arm 127 tends at all times to rock the take-up arm 127 in a clockwise direction as seen in FIG. 1, to take up any slack of the tape T.

After thus being trained about the rollers 124 and 123 of the take-up arm 127, the tape is trained over a guide pin 133 supported on a bracket arm 134 held by a screw 136 to a support 137. Pin 133 supports a pair of adjustable guide collars 138 and 139, the spacing of the two guide sleeves 138 and 139 being adjusted according to the width of the tape T. After thus being trained over the guide pin 133, the tape T is guided beneath an idler roller 138a mounted on a pin shaft 139a extending from the bracket 137. Idler roller 138a has a knurled surface which cooperates with a length of clock spring 141 supported on a block 142 secured in any convenient fashion to the support bracket 137.

The knurled surface on the roller 138a and the clock spring 141 prevent reverse movement of the roller 138a. The tape T which is fed beneath the feed rollers previously described moves between knurled roller 138a and a leaf spring 143 held by a screw 144 to a reciprocating slotted bar 146 of the tape cutting structure 45. The tape is thus slightly constrained between the knurled roller 138a and the leaf spring 143, and is prevented from having reverse movement by reason of the clock spring 141 which cooperates with the knurled roller 138a.

It should be remembered that tape T has its pressure sensitive surface in contact with the idler roller 138a, said surface being uppermost as seen in FIG. 1. It should be remembered also that the arm 127 and the torsion spring 132 are operable to remove the slack of the tape T which has been advanced by the feed roller 112.

Structure is provided for giving feed movement to the roller 112 in prescribed amounts, and to this end, see FIGS. 1 and 3, drive shaft 36 has a crank member 147 mounted fast thereto by means of a key 148. Crank 147 has a crank pin 150 which is connected by a connecting rod 149 to a crank pin 151 extending from rock arm 152 fast on the shaft 113, see FIG. 3. Rock arm 152 supports a pawl 153 mounted on a stub shaft 154 extending from the rock arm 152. Pawl 153 and shaft 154 support a torsion spring 156 which urges the pawl into contact with a ratchet wheel 157 fast on the shaft 113. It will be seen that upon upward movement of the connecting rod 149 as seen in FIG. 1, that the feed roll 112 will be rocked with its shaft 113 so as to provide feed movement to the tape T trained therebeneath.

Mechanism is provided for varying the amount of feed movement of the feed roller 112 by determining the point at which the pawl 153 comes into contact with the ratchet wheel 157 upon upward movement of the connecting rod 149. A tape feed regulating arm 158, see FIGS. 1 and 3, has a hub 159 which is centered on the shaft 113, and hub 159 has an arcuate segment 161 of a radius greater than the radius of the ratchet wheel 157. The arm 158 is adapted to be rotated with the shaft 113 as a center, and its position is referenced with respect to a notched detent plate 162 secured by screws 163 to the top of the frame 22 adjacent the feed roller 112. Detent plate 162 has a plurality of notches 164 along the periphery thereof, these notches cooperating with a detent 166 carried by the detent arm 158.

When the arm 158 is rocked to the extreme counter clockwise position as seen in FIG. 1, the pawl 153 has the maximum amount of engagement with the ratchet wheel 159, resulting in the maximum amount of feed movement of the feed roller 112. Contrariwise, when the arm 158 is rocked to the extreme clockwise position seen in FIG. 1, the arcuate segment 161 "masks off" the amount of engagement of the pawl 153 with the ratchet wheel 159, thereby reducing to the minimum the amount of feed movement of the feed roller 112. The arm 158 together with detent 163 can occupy successive positions between the extremes described for intermediate amounts of feed movement of the feed roller 112.

*Details of tape cutting structure*

The tape cutting structure, which has previously been referred to by the reference numeral 45, see FIG. 1, includes slitter bar 146 which is secured by screws 167 and the screw 144 to a reciprocating shuttle 168. A guide 169 for the shuttle 168 is secured by screws 171 to the frame 22, and the shuttle 168 is guided between the guide 169 and the frame 22 in its reciprocating movement. The shuttle 168 is also supported on a surface 172 in the guide 169 for its reciprocating movement.

Structure is provided for imparting reciprocating movement to shuttle 168 and slitter bar 146, which movement is timed in accordance with the rotating movement of the wrapping chuck 40. To this end the frame 22, see FIGS. 1 to 3, has a push-type solenoid 173 mounted thereon, solenoid 173 having an armature 174 connected by a link 176 to a rock arm 177 fast on a stub shaft 178 supported on the frame 22. A crank arm 179 is fast to the rock shaft 178, and has the upper end thereof engaged with a clevis 181 secured by screws 182 to the end of the shuttle 168. It will be seen that when the solenoid 173 is energized, the shuttle 168 together with the slitter bar 146 supported thereon will move to the left as seen in FIG. 1.

The reciprocating slitter bar 146 has a slot 185 in the end thereof, which cooperates with a fixed knife blade 183 held between a pair of supports 184 and 186, which hold knife blade 183 in clamping engagement. A cap screw 187 extends through supports 184, 186 and screws into support plate 76, thereby fixedly associating the knife blade 183 above the wrapping chuck 40 and in substantial alignment with the slot 185 of slitter bar 146.

A tape contact or "tack" roller 188 for tape T is supported between a pair of clevis arms 189 and on a pin shaft 191 extending between clevis arms 189. Clevis arms 189 are part of a support structure 192 held between the cap screw 187 and the upper support member 186 for the knife blade 183.

The tape contact roller 188 has a rubber surface and the free rotating movement thereof is prevented by a length of clock spring 193 held by the cap screw 187. The assembly described holding the knife member 183 can be adjusted with respect to the bearing support plate 76, and with reference to the open jaw, see FIG. 7, of the wrapping chuck 40.

Operation

The operation of the apparatus according to the present invention will best be understood with reference to FIGS. 10 to 17 inclusive, which show the wrapping chuck and the tape severing mechanism somewhat schematically. At the start of the wrapping sequence, the parts are in a position as seen in FIGS. 1 and 10, with the fed length of tape overlying slightly the "tack" roller 189, and across the open jaw 87 of the wrapping chuck 40, the tape being spaced above the jaw 87 as seen in FIG. 10.

In this position of the parts, the tape slack take-up arm 127 is substantially in the position seen in FIG. 1, the retrograde movement of that portion of the tape between the roller 124 and the roller 138a being prevented by the clock spring 141 which holds knurled roller 138a in locked position. It will be remembered that the length of tape between the rollers 124 and 138a is held between the periphery of the roller 138a and the spring 143.

As seen in FIGS. 10 and 11, the bundle B, as yet unwrapped, is moved down across the length of the tape spanning the open jaw 87 of chuck 40. Since the "tack" of the tape T is uppermost, the downward movement of the bundle B will engage the same, and the bundle B can be further moved down into the chuck 40 as seen in FIG. 12. In such movement, the "tack" of the tape against the bundle B and the movement of the bundle B into the chuck 40 causes the tape to be pulled, and the arm 127 to be rocked in a counter-clockwise direction.

When the tape is properly centered within the chuck 40, the solenoid 47 is energized to give the driving motion to the chuck 40 which goes through a number of turns necessary to complete a wrapping operation, the bundle B being constrained within the clock springs 107 and 108 within the chuck 40.

As was described previously, the energization of the solenoid 47 causes the driving motion to be given to the shaft 36 and causes the shaft 36 to move through a full revolution. Since the solenoid 47 is energized only for a period of time necessary to cause release of the pawl arms 52 and 61 with their respective stop 41 and detent slot 63, the shaft 36 will be driven through one revolution, at which time the clutching connection from the motor 24 will be released, and also at which time the shaft will be locked in a proper detent position by engagement of detent pawl arm 61 with the slot 63 in the detent member 44.

By reason of the gear train 99, 102 and 103 for drivign the chuck 40, the chuck 40 is driven through a number of turns necessary to complete a wrapping operation. At the start of the wrapping operation, and as seen particularly in FIGS. 12 and 13, the solenoid 173 for operating the slitter bar 146 is energized, moving the slitter bar 146 to the left as seen in FIGS. 1, 12 and 13 to sever the tape at knife 183.

The movement of the slitter bar 146 is accompanied also by feed movement of the feed roller 112, which feeds an additional length of tape. Such movement accompanied by the movement of the slitter bar 146, gives extra feed movement to tape T, and at the conclusion of the cutting operation as seen in FIG. 13, the tape T remains stuck to the roll 189 since the "tack" of the tape T is uppermost.

At the conclusion of the cutting operation, the chuck 40 goes through the necessary number of revolutions to complete the wrapping of the bundle B as seen in FIG. 14.

At this time the slitter bar 146 has retracted, and the parts are back to the position as seen in FIG. 10, except that the tape T is still in "tacking" engagement with the roller 189.

The shaft 36 is indexed to a position corresponding to the position of the chuck 40 seen in FIG. 1, when the slitter bar 146 and the wrapped article are in the position seen in FIG. 15 to a position corresponding to the position of the chuck 40 seen in FIG. 1, and the position of the slitter bar 146 seen also in said figure. The wrapped article is ready now to be removed from the wrapping chuck 40, and the same is done as seen in FIG. 16, the wrapped bundle moving upward across the tape T, which now separates from the roller 189.

After the removal of the wrapped bundle from the chuck 40, the tape T is free once more to fall against the roller 189, in position to resume a sequence of operations as previously described.

While the invention has been described with respect to a preferred embodiment thereof, its scope is intended to be limited only by the claims here appended.

I claim:

1. In apparatus for wrapping a length of pressure sensitive tape about an elongate article, a rotatable wrapping chuck having a radially extending jaw adapted to receive said elongate article, means for feeding a length of said tape across said jaw, means for varying the amount of feed movement of said feeding means, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means spaced from the axis of rotation of said chuck, a slitter bar spaced from the axis of rotation of said chuck including means for moving said slitter member in timed relationship to said chuck, and movable with respect to said stationary knife means and into contact therewith to sever said tape while the same is wrapped as a bight about said elongate article, tape slack take-up means interposed between said chuck and said feeding means and adapted to yield as said bight is formed in said tape, a stationary roller member disposed in relationship to said stationary knife means and said slitter member and adapted to hold the pressure sensitive tape thereto by the "tack" thereof upon return movement of said slitter bar.

2. In apparatus for wrapping a length of pressure sensitive tape about an elongate article, a rotatable wrapping chuck having a radially extending jaw adapted to receive said elongate article, means for feeding a length of said tape across said jaw, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means spaced from the axis of rotation of said chuck, a slitter bar spaced from the axis of rotation of said chuck including means for moving said slitter member in timed relationship to said chuck, and movable with respect to said stationary knife means and into contact therewith to sever said tape while the same is wrapped as a bight about said elongate article, tape slack take up means interposed between said chuck and said feeding means and adapted to yield as said bight is formed in said tape, a stationary roller member disposed in relationship to said stationary knife means and said slitter member and adapted to hold the pressure sensitive tape thereto by the "tack" thereof upon return movement of said slitter bar.

3. In apparatus for wrapping a length of pressure sensitive tape about an elongate article, a rotatable wrapping chuck having a radially extending jaw adapted to receive said elongate article, means for feeding a length of said tape across said jaw, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means spaced from the axis of rotation of said chuck, a slitter bar spaced from the axis of rotation of said chuck and movable across said rotating chuck to said stationary knife means and into contact therewith to sever said tape while the same is wrapped as a bight about said elongate article, a stationary roller member disposed in relationship to said stationary knife means and said slitter member and adapted to hold the pressure sensitive tape thereto by the "tack" thereof upon return movement of said slitter bar.

4. In apparatus for wrapping a length of pressure sensitive tape about an elongate article, a rotatable wrapping chuck having a radially extending jaw adapted to receive said elongate article, means for feeding a length of said tape across said jaw, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means to sever said length of tape, tape slack take up means interposed between said chuck and said feeding means and adapted to yield as said bight is formed on said tape, a slitter bar movable with respect to said stationary knife means and adapted to move against the same to sever said tape while the same is wrapped as a bight about said elongate article, a stationary roller member disposed in relationship to said stationary knife means and said slitter member and adapted to hold the pressure sensitive tape thereto by the "tack" thereof upon return movement of said slitter bar.

5. In apparatus for wrapping a length of pressure sensitive tape about an elongate article,
   a rotatable wrapping chuck having a radially extending jaw adapted to receive said elongate article while said wrapping chuck is in an initial position prior to the rotation of the same;
   drive means for rotating said wrapping chuck to wrap tape around the article;
   a tape feed means to feed tape toward the wrapping chuck;
   a knife means to sever said length of tape for wrapping said article; and
   means for positioning a second length of tape across the wrapping chuck prior to the severing of said first-mentioned length of tape, said second length of tape being positioned over the opening of the jaw when the wrapping chuck is in said initial position with the outer exposed surface of the tape comprising the pressure sensitive side thereof, whereby an initial bight of said last-mentioned length of tape is made on the article when the article is placed on said pressure-sensitive side of the tape and inserted into the chuck.

6. In apparatus for wrapping a length of pressure sensitive tape about an elongate article, a rotatable wrapping chuck having a radially extending jaw adapted to receive said elongate article, means for feeding a length of said tape across said jaw, means for varying the amount of feed movement of said feeding means, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means to sever said length of tape, a slitter bar movable with respect to said stationary knife means including means for moving the same in timed relationship to the rotation of said chuck to sever said tape while the same is wrapped as a bight about said elongate article, a stationary roller member disposed in relationship to said stationary knife means and said slitter member and adapted to hold the pressure sensitive tape thereto by the "tack" thereof upon return movement of said slitter bar.

7. In apparatus for wrapping a length of pressure sensitive tape about an elongate article, a rotatable wrapping chuck having a radially extending jaw adapted to receive said elongate article, means for feeding a length of said tape across said jaw, drive means for rotating said wrapping chuck, and constraining means disposed within said jaw to receive said article with an initial bight of said length of tape thereon, said constraining means maintaining said initial bight on said tape while said chuck is rotating thereby enabling said tape to be wrapped around said article, stationary knife means to sever with said length of tape a slitter bar movable with respect to said stationary knife means and adapted to move against the same to sever said tape while the same is wrapped as a bight about said elongate article, a stationary roller member disposed in relationship to said stationary knife means and said slitter member and adapted to hold the pressure sensitive tape thereto by the "tack" thereof upon return movement of said slitter bar.

8. A wrapping apparatus as defined in claim 5 wherein:
   said first-mentioned length of tape is initially positioned across said jaw with the trailing edge of the tape adjacent the side of the jaw nearest the tape feed means and the leading edge of the tape adjacent the opposite side of the jaw, said first length of tape providing an initial bight on the article after the same is placed thereon and inserted into the jaw, said tape severing means being positioned adjacent said opposite side of the jaw; and
   said means for positioning said second length of tape across the wrapping chuck comprises a slitter bar carrying the trailing edge of the first length of tape toward the knife means after the article had been inserted into the jaw and simultaneously pulling said second length of tape across the chuck, said first length of tape being severed from the remaining supply of tape after the second length of tape is positioned to lie across the opening of the jaw when the wrapping chuck is in said initial position.

9. The apparatus of claim 8 including constraining means disposed within said jaw to receive said article and securely maintain thereon said initial bight of the first length of tape as said second length of tape is being drawn across the wrapping chuck.

10. The apparatus of claim 9 wherein said constraining means comprises a pair of leaf springs resiliently biased toward each other, said leaf springs being spread apart as said article with said initial bight of tape thereon is inserted therebetween, and said leaf springs rotating with said wrapping chuck to thereby enable a secure wrap to be formed around the article.

11. The apparatus of claim 10 wherein:
   the slitter bar includes an outer end having a slot therein, the trailing edge of the tape being positioned in front of the outer end of the slitter bar prior to the severing of the tape, said knife means telescoping within said slot to sever the first length of tape along the trailing edge thereof.

12. The apparatus of claim 8 wherein:
   a roller member having an upper and a lower end disposed adjacent the knife means, the lower end of the roller member contacting the pressure sensitive surface of said second length of tape and maintaining the same across the jaw after the knife means has cut the first length of tape, said slitter bar moving away from the knife means after the same has cut the tape, the removal of the article from the chuck after completion of the wrapping operation causing the second length of tape to be pulled upwardly and out of contact with the lower end of the roller, the upper end of the roller providing a support surface for the second length of tape prior to the placement of an article thereon for wrapping.

13. The apparatus of claim 12 wherein:
    a leaf spring is associated with the top surface of said slitter bar;
    a knurled roller is positioned above said leaf spring, said slitter bar moving toward the knife means causing the tape to pass between the roller and the leaf spring; and
    a crank member is associated with said drive means and said slitter bar, said crank member being operable to move the slitter bar toward said knife means for severing the first length of tape and simultaneously drawing a second length of tape across the wrapping chuck, said slitter bar moving away from the knife means after the severing of the first length of tape.

14. The apparatus of claim 8 wherein said tape feed means comprises:
    a tape feed roller mounted on a feed shaft, said tape feed roller advancing the tape contacting the bottom end thereof in the direction toward the chuck;
    a ratchet wheel fixedly mounted on said feed shaft;
    a crank member associated with said drive means and rotating therewith;
    a rocker arm pivotally mounted on said feed shaft;
    a pawl supported on said rocker arm;
    a resilient means urging said pawl to engage said ratchet wheel; and
    a connecting rod connecting a point on the crank member offset from the center thereof with the rocker arm, said connecting rod moving upwardly and downwardly for each rotation of the crank member, said pawl engaging said ratchet wheel and causing said tape feed roller to rotate when the connecting rod moves from a lower level to an upper level upon rotation of the crank member.

15. The apparatus of claim 14 including a tape feed regulator means, said tape feed regulator means comprising a hub positioned on said feed shaft, said hub including an arcuate segment having a radius greater than that of the radius of the ratchet wheel, the outer periphery of said segment being capable of blocking said pawl from engaging said ratchet wheel, said arcuate segment being positionable around said shaft to control the rotation of the ratchet wheel by said pawl upon each rotation of said crank member.

16. The apparatus of claim 8 including a pivotally mounted slack take-up arm positioned between the wrapping chuck and the tape feed means and resilient means urging said slack take-up arm to rock toward the tape in contact therewith, said slack take-up arm providing tautness in the tape substantially independent of the magnitude of the length of tape fed to the wrapping chuck.

References Cited by the Examiner

UNITED STATES PATENTS 2,834,499 5/1958 Semkow _____ 156—486
3,031,368 4/1962 Zent _____ 156—443 X EARL M. BERGERT, *Primary Examiner.*

P. DIER, *Assistant Examiner.*